United States Patent [19]

Takahashi et al.

[11] Patent Number: 5,487,513
[45] Date of Patent: Jan. 30, 1996

[54] PHOTOGRAPHIC FILM CASSETTE MACHINE WITH FILM ANCHORING DEVICE

[75] Inventors: Koichi Takahashi; Hiroshi Kataoka; Haruo Ichikawa; Tetsuya Takatori; Toshiharu Naito, all of Kanagawa, Japan

[73] Assignee: Fuji Photo Film Co., Ltd., Kanagawa, Japan

[21] Appl. No.: 197,455

[22] Filed: Feb. 16, 1994

Related U.S. Application Data

[63] Continuation of Ser. No. 791,285, Nov. 13, 1991, abandoned.

[30] Foreign Application Priority Data

Nov. 13, 1990 [JP] Japan .................................. 2-306533
Feb. 4, 1991 [JP] Japan .................................. 3-035732

[51] Int. Cl.$^6$ ..................................................... G03B 23/02
[52] U.S. Cl. ..................................... 242/348.1; 242/548.1
[58] Field of Search ............................... 242/71.1, 71.8, 242/74, 348.1, 548.1, 587.1, 578.2; 354/275

[56] References Cited

U.S. PATENT DOCUMENTS

| | | | |
|---|---|---|---|
| 1,469,018 | 9/1923 | Kinasbury | 242/71.8 |
| 1,497,707 | 6/1924 | Duden | 242/71.8 |
| 2,336,278 | 12/1943 | Mihalyi | 242/71 |
| 2,360,255 | 10/1944 | Mihalyi | 242/71.5 |
| 2,364,381 | 12/1944 | Mihalyi | 242/71 |
| 2,400,024 | 5/1946 | Roehrl | 242/71.8 |
| 2,521,935 | 9/1950 | Monroe . | |
| 2,552,200 | 5/1951 | Mihalyi | 242/71.1 |
| 2,643,072 | 6/1953 | Kugel | 242/71.8 |
| 3,467,340 | 9/1969 | Rosenburg . | |
| 3,556,435 | 1/1971 | Wangerin . | |
| 3,604,651 | 9/1971 | Ohno | 242/548.1 |
| 3,627,229 | 12/1971 | Wangerin . | |
| 3,627,230 | 12/1971 | Wangerin | 242/71.8 |
| 3,677,499 | 7/1972 | Wangerin | 242/210 |
| 3,797,777 | 3/1974 | Hosono et al. | 242/71.8 |
| 4,145,133 | 3/1979 | Wareham | 242/71.7 |
| 4,398,679 | 8/1983 | Kluczynski et al. | 242/584.1 |
| 4,832,275 | 5/1989 | Robertson | 242/71.1 |
| 4,834,306 | 5/1989 | Robertson et al. | 242/71.1 |
| 4,834,310 | 5/1989 | Ikariya et al. | 242/584.1 |
| 4,930,712 | 6/1990 | Smart | 242/348.1 |
| 4,955,555 | 9/1990 | Pierson et al. | 242/74 |
| 4,962,401 | 10/1990 | Takahasi | 242/71.8 |
| 5,003,334 | 3/1991 | Pagano et al. | 354/275 |
| 5,054,710 | 10/1991 | Ikariya et al. | 242/74 |
| 5,360,183 | 11/1994 | Takahashi et al. | 242/548.1 X |

FOREIGN PATENT DOCUMENTS

| | | |
|---|---|---|
| 0077972 | 5/1981 | European Pat. Off. . |
| 2921379 | 11/1980 | Germany . |

*Primary Examiner*—Daniel P. Stodola
*Assistant Examiner*—Eileen A. Dunn
*Attorney, Agent, or Firm*—Sughrue, Mion, Zinn, Macpeak & Seas

[57] ABSTRACT

A photographic film cassette, having a spool with a slit therein, in which a film trailer is anchored. Abutting walls are formed on the inside of the slit so as to receive the end of the film trailer, and transmit the rotation of the spool to the roll of film. The film trailer anchored on the spool core is guided by a guide portion on the spool core to be wound smoothly in contact with the surface of the spool core. In a preferred embodiment, the spool consists of two spool pieces. A shaft portion of the external spool piece is inserted in that of the internal spool piece. The film trailer is inserted and anchored between the shaft portions which are fitted together.

6 Claims, 16 Drawing Sheets

PHOTOGRAPHIC FILM CASSETTE MACHINE WITH FILM ANCHORING DEVICE

This is a Continuation of application No. 07/791,285 filed Nov. 13, 1991, now abandoned.

BACKGROUND OF THE INVENTION

1. Field of the Invention

The present invention relates to a photographic film cassette. In particular, the present invention is an improved photographic film cassette in which rotation of a spool causes a film leader to advance to the outside of a cassette shell.

2. Description of the Related Art

One conventional type of film cassette has 35 mm photographic film positioned so that the film leader does not protrude from the cassette shell prior to loading the film cassette into a camera. Such a film cassette is easily loaded. Simple feeding mechanisms are used with this type of film cassette including a construction which rotates the spool to unwind the photographic film thereby causing the film leader to move through a film passage mouth and exit the film cassette. Such a device is disclosed in U.S. Pat. Nos. 4,834,306 and 4,832,275.

In the above mentioned conventional film cassette, a spool is rotatably contained in a cassette shell which consists of upper and lower shell halves. A pair of annular ridges are formed on the inside surface of the cassette shell so as to contact the outermost turn of the roll of film to prevent it from loosening. A separating claw is provided inside the cassette shell for separating a film leader of the photographic film from the roll of film so as to direct it to a film passage mouth for a film initial advance. Therefore, the film leader is advanced to exit the film cassette through the film passage mouth by rotating the spool in the direction of unwinding the photographic film. It is noted that a pair of rings rotatably mounted on the inside cylindrical surface of the cassette shell, or a pair of circumferential ridges formed on the peripheral edges of the flanges, projecting toward the respective opposite flanges, may be provided, in place of the annular ridges, to prevent the roll of film from loosening.

FIG. 24 illustrates spool 7, having a construction in which photographic film 6 does not become detached from spool 7, even by fully drawing photographic film 6 from the cassette shell, as film trailer 5 is reliably fixed to spool 7. Slit 16 is formed in spool core 7a between flanges 9 and 10 for inserting film trailer 5 therein. A pair of anchoring claws 17 and pressing projections 18 are formed in slit 16. When film trailer 5 is inserted in slit 16, anchoring claws 17 are engaged with a pair of holes 15 formed in film trailer 5, so that film trailer 5 becomes anchored in slit 16, by virtue of engagement between holes 15 and anchoring claws 17, and held into engagement by contact with pressing projections 18, as illustrated in FIG. 27.

When spool 7 is rotated in the direction of winding up of photographic film 6 with trailer holes 15 anchored on claws 17, photographic film 6 is wound onto spool 7 with film trailer 5 bent on an edge of the entrance 16a of slit 16 at an angle of 90 degrees or less in the direction opposite to winding up of photographic film 6. A portion of photographic film 6 bent at the entrance to slit 16a is herein called film root portion 5b. Because film root portion 5b is so sharply bent on spool core 7a, the innermost turn of photograph film 6, close to film root portion 5b, is subjected to a force tending to restore the initial straight form of photographic film 6, due to its rigidity.

The portion of the innermost turn close to film root portion 5b thus loses contact with spool core 7a so that photographic film 6 is wound in a roll having an oval shaped, or eccentric, cross section with respect to spool core 7a. When spool 7 is rotated so as to unwind photographic film 6 under this condition, annular ridges formed on the inside of the cassette shell are opposed by an excessive force at the outermost position corresponding to film root portion 5b. This increases the torque necessary to cause film leader 5 to exit the cassette shell. The battery in the camera loaded with such a conventional film cassette is thus discharged much faster than is required because a relatively large load is applied to the motor in the camera when transporting photographic film 6.

Spool 7, as illustrated in FIG. 24, is also disadvantageous because it does not reliably transmit the rotation of spool 7 to the roll of photographic film 6 when spool 7 is rotated. This is so because when the film leader is actually propelled through the film passage mouth by rotating spool 7, the plush material, disposed inside the film passage for the purpose of limiting light entering therethrough, applies a load to the film leader because the film leader is forced to advance between upper and lower plush material pieces. This load is transmitted to the anchoring construction of film trailer 5 on spool 7 via the roll of photographic film 6.

Even though spool 7 is rotated in the direction so as to unwind photographic film 6, as indicated by arrow F in FIG. 26, the additional load on film leader 6a causes film trailer 5 to move from the anchoring position on spool 7 toward the exit of slit 16. Shoulder portions 5a, defined on the lateral sides of film trailer 5, by reducing the width of the photographic film 6, are abutted on spool core 7a as illustrated in FIGS. 26 and 27. Further rotation of spool 7 in the direction of F causes film trailer 5 to flex into a U-shaped cross-section reverse to the direction of convolutions of the roll of film 6. Shoulder portions 5a are thus subjected to a large pressure by contact with the entrance of slit 16. Accordingly, crack S, indicated by the broken line in FIG. 27, tends to occur in shoulder portions 5a. Accordingly, it is possible for film trailer 5 to be cut off when the applied pressure is high so as cause the film cassette to fail to advance film 6.

SUMMARY OF THE INVENTION

It is therefore an object of the present invention to provide a photographic film cassette in which the photographic film is prevented from being wound into an eccentrically shaped roll.

It is another object of the present invention to provide a photographic film cassette in which the rotary force, caused by rotation of a spool in the film unwinding direction, can be reliably transmitted to the film via a film trailer.

In order to achieve the above, and other objects and advantages, the invention is a film cassette having a slit formed in a core of the spool for inserting the film trailer of the photographic film. An anchoring device is disposed inside the slit for anchoring the film trailer and an abutting device for receiving an end of the film trailer, is also provided. By virtue of this design cracking will not take place on the film trailer, and the trailing end portion will not be cut off due to the applied pressure.

In accordance with a preferred embodiment, first and second spool components are assembled so as to make up the spool. The film trailer is inserted between the spool components. An anchoring device is provided on the first and/or second spool component, so as to anchor the film trailer on the spool. A pressing portion is formed on an edge portion of the first or second spool component so as to press a portion of the film trailer, passed between the first and second spool components, toward an axis of a core of the spool. This prevents the photographic film from being wound into an irregular, or eccentric, roll. Further, an edge of the first slit, on a side of a direction of unwinding the photographic film, is provided with an inclined surface, which also serves to allow the photographic film to be wound in a roll free from irregularity. Accordingly, no extra torque need be applied to cause the film leader to exit. Thus, the battery in the camera, loaded with the film cassette of the invention, will not be discharged as fast as in the case of conventional film cassettes.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
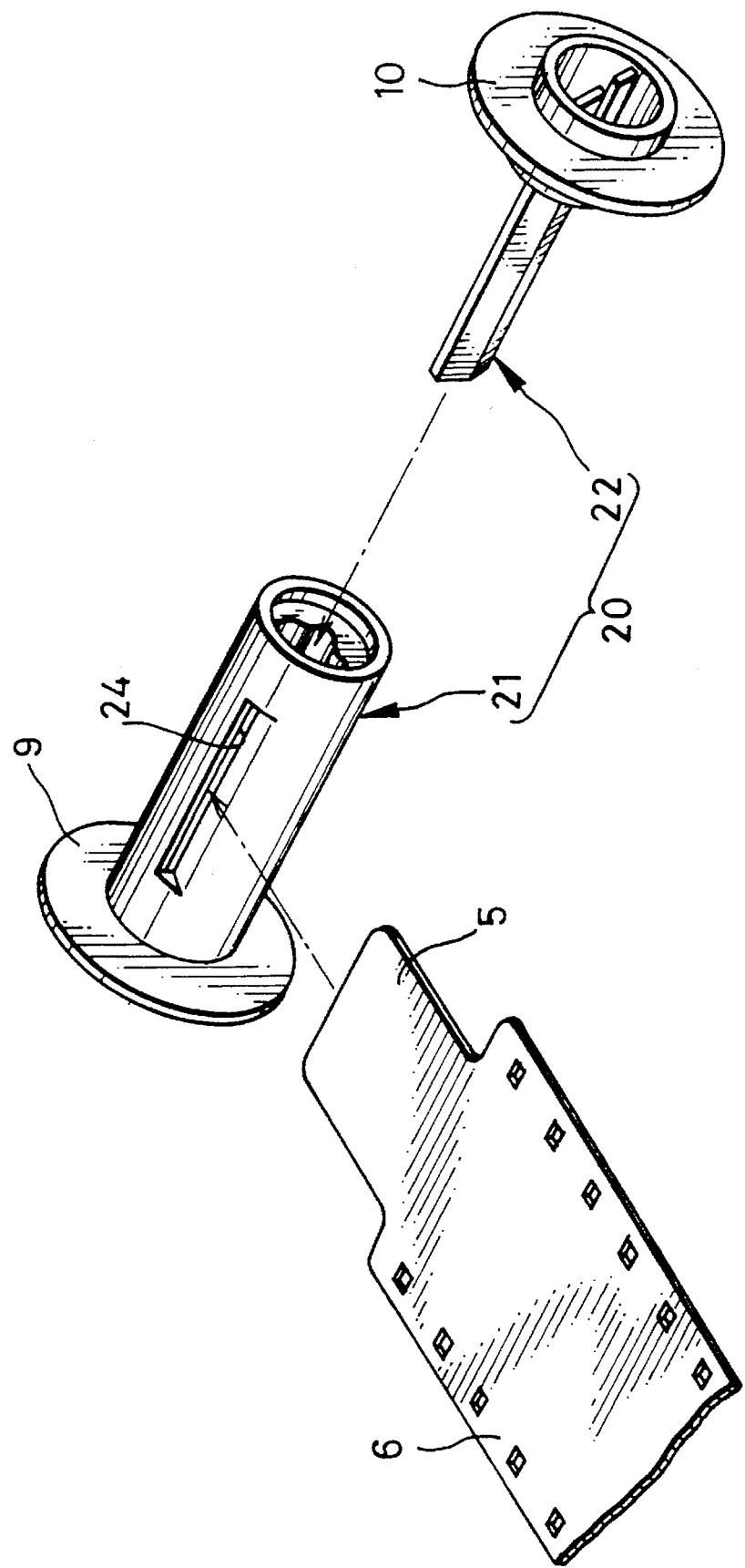
FIG. 1 is an exploded perspective view illustrating a photographic film cassette according to a first preferred embodiment of the present invention.
Figure 2:
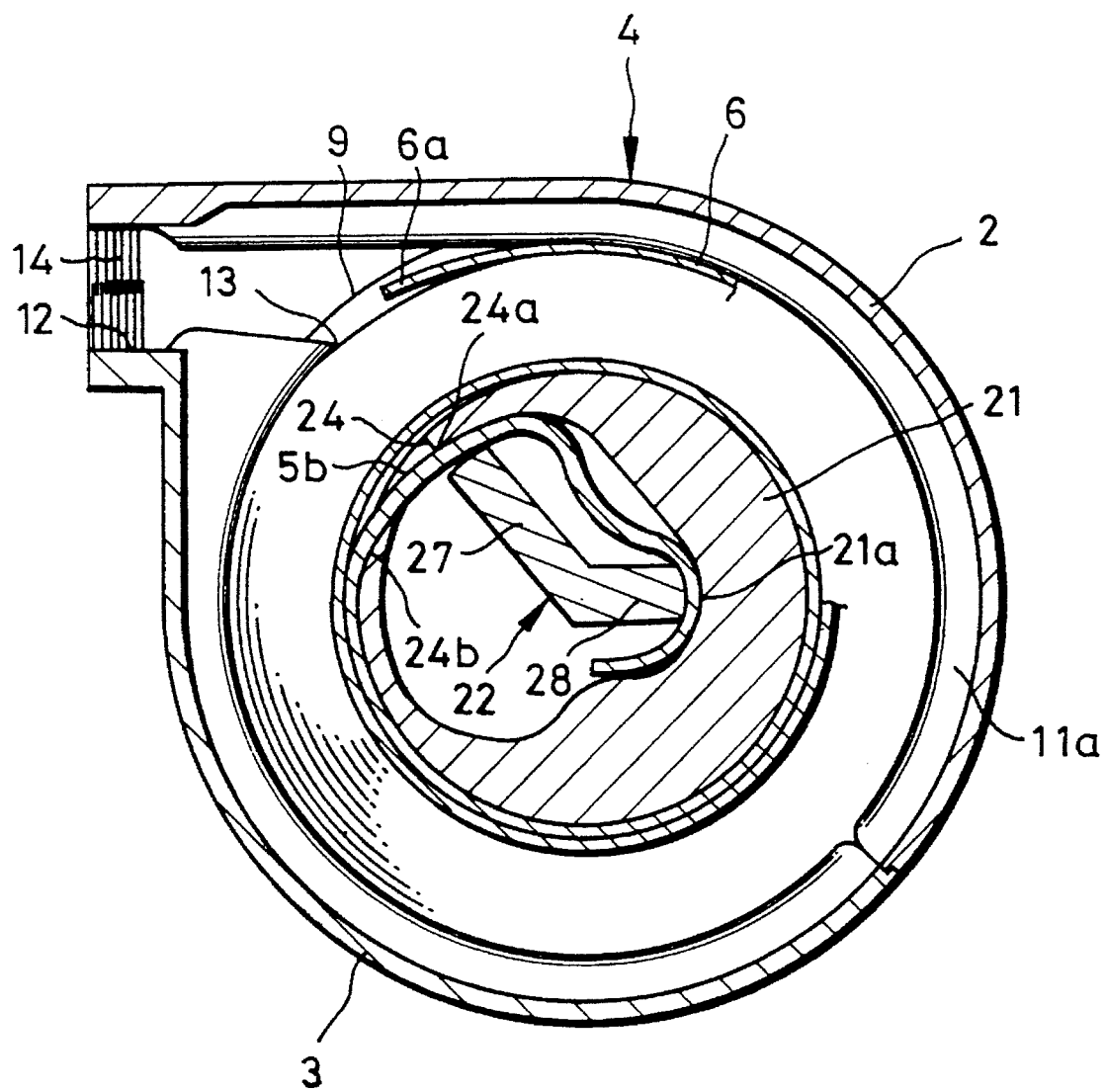
FIG. 2 is a cross section illustrating the film cassette.

A first preferred embodiment of the present invention will now be described with reference to FIGS. 1 to 4. Elements similar to those of the conventional film cassette described above are designated with identical reference numerals. Spool 20 consists of external spool piece 21 and internal spool piece 22, which are rotatably supported in cassette shell 4 which consist of upper and lower shell halves 2 and 3. Flanges 9 and 10 are integrally formed on respective spool pieces 21 and 22. External spool piece 21, about which photographic film 6 is wound, is of a tubular shape, in other words, cylindrical and hollow. Slit 24 is formed on external spool piece 21 for inserting film trailer 5 therein. As is illustrated in FIG. 2, pressing edge 24a is formed proximate an edge of slit 24 for pressing film root portion 5b of photographic film 6 toward the axis of spool 20. Sloped edge 24b is formed opposite pressing edge 24a for maintaining film root portion 5b in a continuous curve so as to smoothly contact the surface of external spool piece 21 while film root portion 5b is pressed by pressing edge 24a.

The shaft portion of internal spool piece 22 consists of wide blade 27 and narrow blade 28 formed together in the shape of a letter V. Internal spool piece 22 is inserted in external spool piece 21 in the axial direction. Film trailer 5 is fixedly held between inside surface 21a of external spool piece 21 and a lengthwise edge of narrow blade 28 by rotating internal spool piece 22 in the film wind-up direction relative to external spool piece 21. (See FIGS. 2 and 4.) Engaging portions 29 are formed on the ends of respective spool pieces 21 and 22 for being engaged when spool pieces 21 and 22 are rotated by the camera mechanism.

At least one ridge 11a is formed on the inside surface of cassette shell 4 so as to contact the outermost turn of the roll of film 6 to prevent it from loosening. Separating claw 13 separates film leader 6a from the roll of film 6 to direct it to film passage mouth 12 during initial advance. Plush, or light-trapping fabric, 14 is attached to the inner surfaces of film passage mouth 12 so as to prevent light from entering cassette shell 4 through film passage mouth 12.

The operation of the first preferred embodiment will now be described in detail. To anchor film trailer 5 on spool 20, film trailer 5 is inserted to slit 24 before internal spool piece 22 is inserted in external spool piece 21. After insertion, internal spool piece 22 is rotated in the film wind-up direction while external spool piece 21 is rotated in the opposite direction, so that inside surface 21a and narrow blade 28 fixedly nip film trailer 5. In cross section, inside surface 21a has an eccentric shape, so as to gradually project toward the center of spool 20 in the film wind-up direction from the nipping position of the narrow blade 28. When film trailer 5 is nipped, external and internal spool pieces 21 and 22 are securely locked together.

Both external and internal spool pieces 21 and 22 are then rotated together in the film wind-up direction so as to wind photographic film 6 on the outside of external spool piece 21. Photographic film 6 is wound in a regularly cylindrical roll, concentric with spool 20, due to the above-mentioned cooperation between pressing edge 24a and sloped edge 24b which prevents film root portion 5b from being bent sharply.

Figure 3:
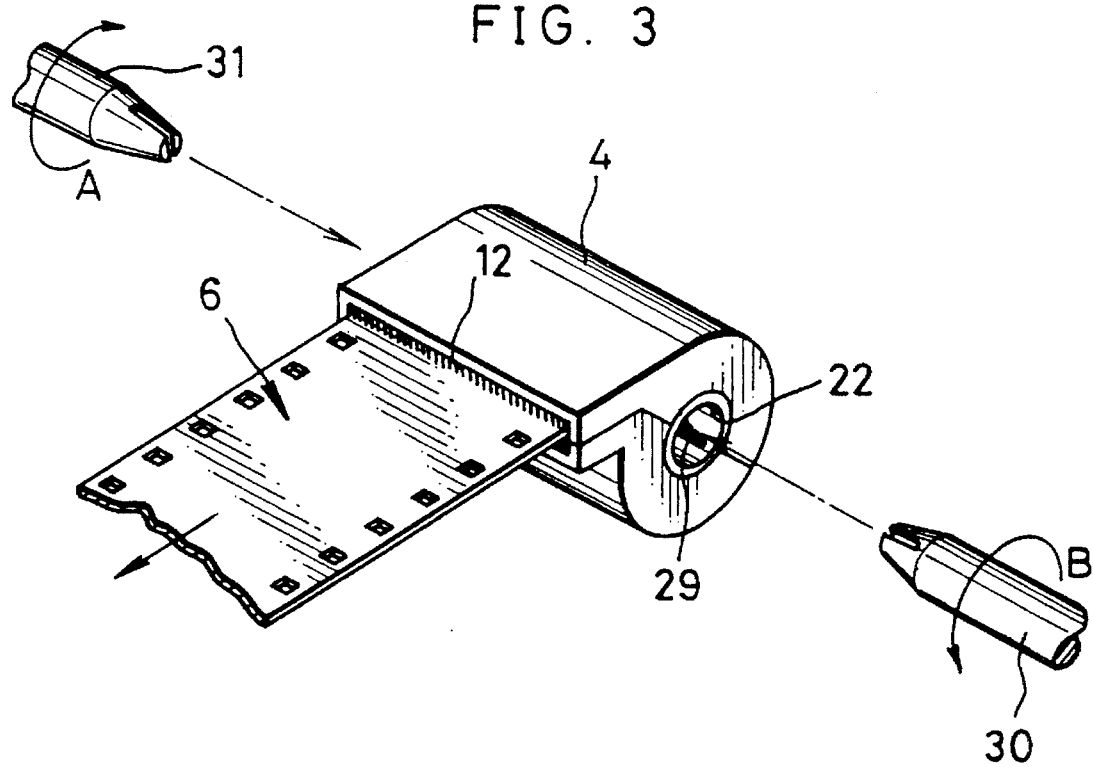
FIG. 3 is a perspective view illustrating a state where a photographic film is taken from a cassette shell.
Figure 4:
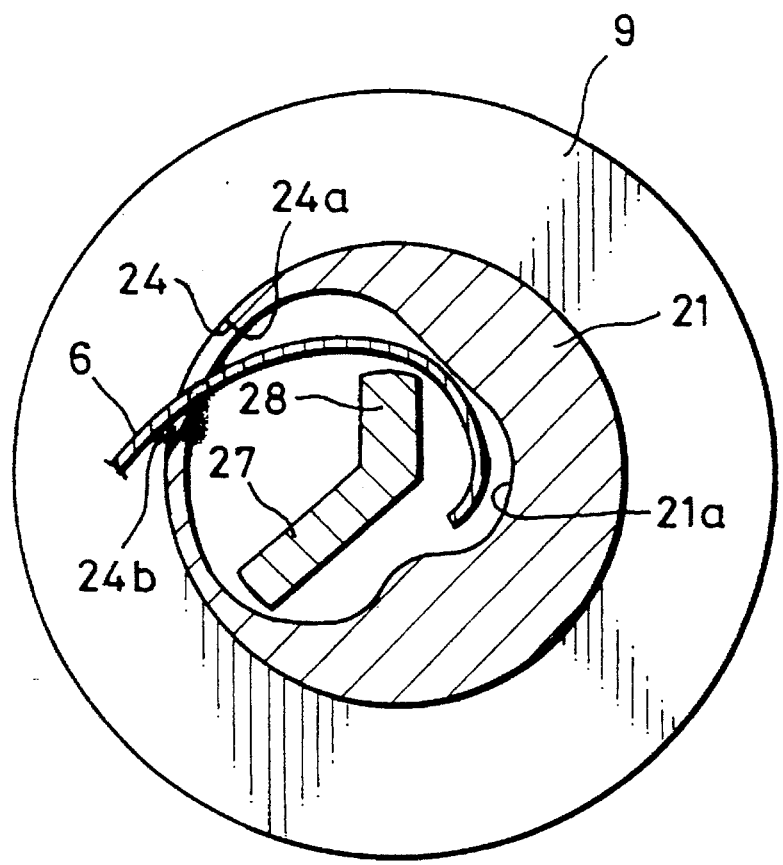
FIG. 4 is a cross section illustrating an important portion of the film cassette in a state where a film trailer is released from an anchor on a spool.

To release film trailer 5 from spool 20, engaging portions 29, exposed to the outside of both end faces of cassette shell 4, are engaged with jigs 30 and 31, as illustrated in FIG. 3. Jig 31 is rotated in the direction of arrow A while jig 30 is rotated in the opposite direction, indicated by arrow B. Accordingly, internal spool piece 22 is rotated in the film unwinding direction relative to external spool piece 21. Narrow blade 28 is then unlocked from inside surface 21a so as to release film trailer 5 as illustrated in FIG. 4. Photographic film 6 can then be smoothly detached and removed from cassette shell 4.

Photographic film 6 in a conventional film cassette is drawn out and cut off near film passage mouth 12 because it is impossible to detach film trailer 5 from spool 7 without disassembling cassette shell 4. However, the film cassette according to the present invention requires no such laborious operation, so that efficiency in the film developing process is improved.

When photographic film 6 of the conventional film cassette is drawn out by an automatic film processor, film trailer 5 and the anchoring construction of spool 7 are subjected to large impact forces which might cause damage to photographic film 6. It is, however, possible by use of the present invention to remove the photographic film 6 without causing damage to film 6 because the anchor can be released beforehand.

Figure 5:
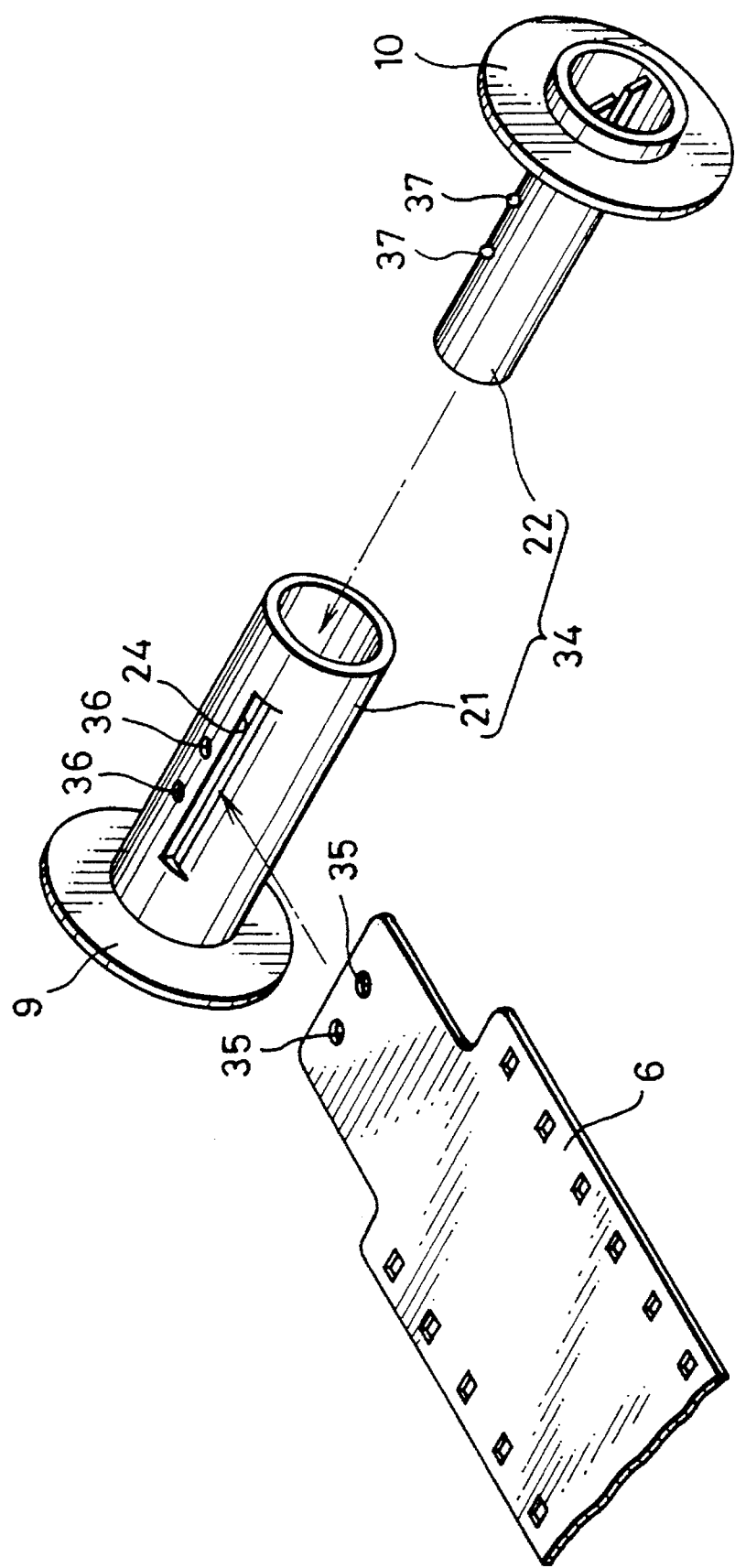
FIG. 5 is an exploded perspective view illustrating a film cassette according to a second preferred embodiment of the present invention.

A second preferred embodiment will now be described with reference to FIGS. 5–7. Spool 34 is comprised of external and internal spool pieces 121 and 122, and rotatably supported in cassette shell 4. Two holes 35 formed in film trailer 5 are anchored by two projections 37 formed on internal spool piece 122 which engage respectively with two holes 36 formed on external spool piece 121.

In operation, film trailer 5 is inserted in slit 24 of external spool piece 121 until trailer holes 35 are positioned in or slightly behind slit 24. Internal spool piece 122 is inserted to the external spool piece 121 so that trailer holes 35 are engaged with projections 37 which are tapered. (See FIG. 6). Internal spool piece 122 is rotated in the film wind-up direction, while external spool piece 121 is rotated in the film unwinding direction, until projections 37 are fitted in holes 36 so as to maintain trailer holes 35 on projections 37. This rotation can be smoothly performed due to the tapered shape of projections 37. Holes 36 anchor projections 37 as illustrated in FIG. 7.

Both spool pieces 121 and 122 are then rotated together in the film wind-up direction so as to wind photographic film 6 onto the outside of the external spool piece 121. Photographic film 6 is thus wound in a regularly cylindrical roll concentric with spool 34, due to the interaction of pressing edge 24a and sloped edge 24b with photographic film 6 in the same manner as the first embodiment.

Figure 6:
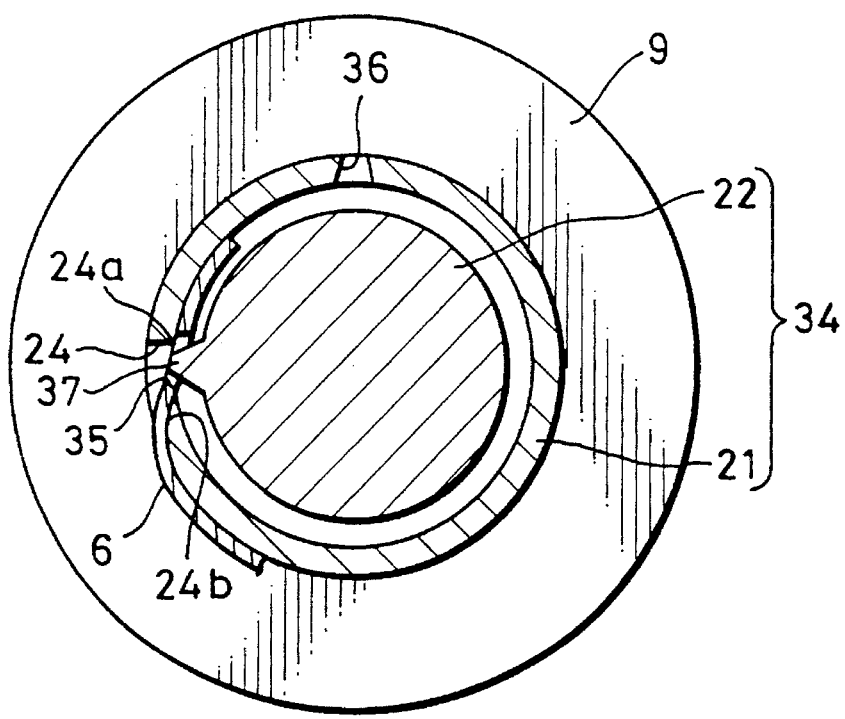
FIG. 6 is a cross section illustrating an important portion of the film cassette of FIG. 5 in a state where the film trailer is inserted in a slit.
Figure 7:
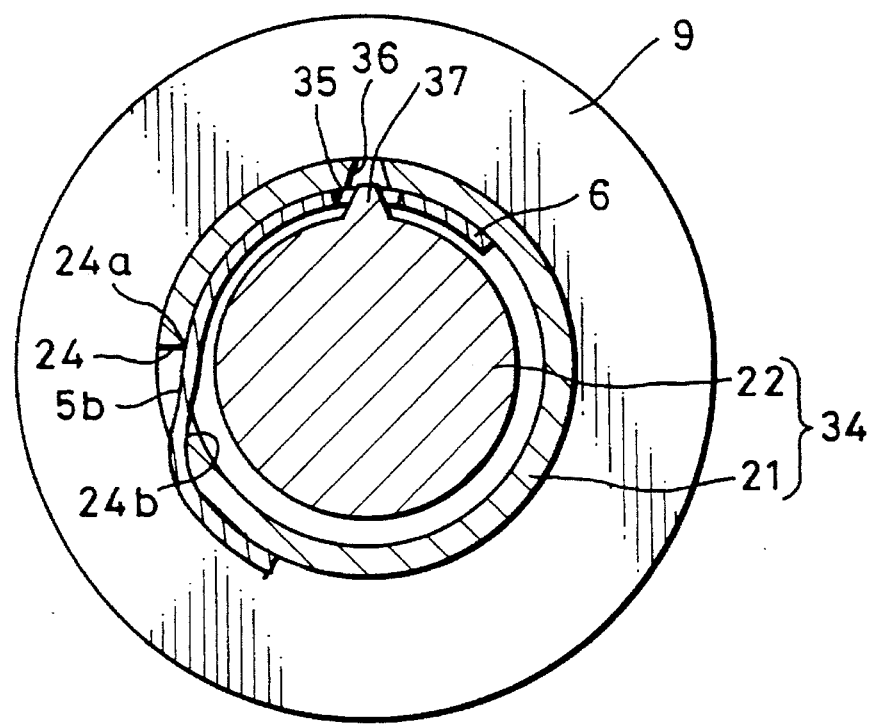
FIG. 7 is a cross section illustrating the film cassette of FIG. 5 in a state where the film trailer is anchored on a spool.

In order to disengage film trailer 5 from spool 34, internal spool piece 122 is rotated in the film unwinding direction while rotating external spool piece 121 in the film wind-up direction by use of jigs, similar to those used in the first embodiment, until spool pieces 121 and 122 are relatively positioned as in FIG. 6. Photographic film 6 can then be withdrawn to easily remove film trailer 5 from projections 37 due to the tapered shape of projections 37.

Figure 8:
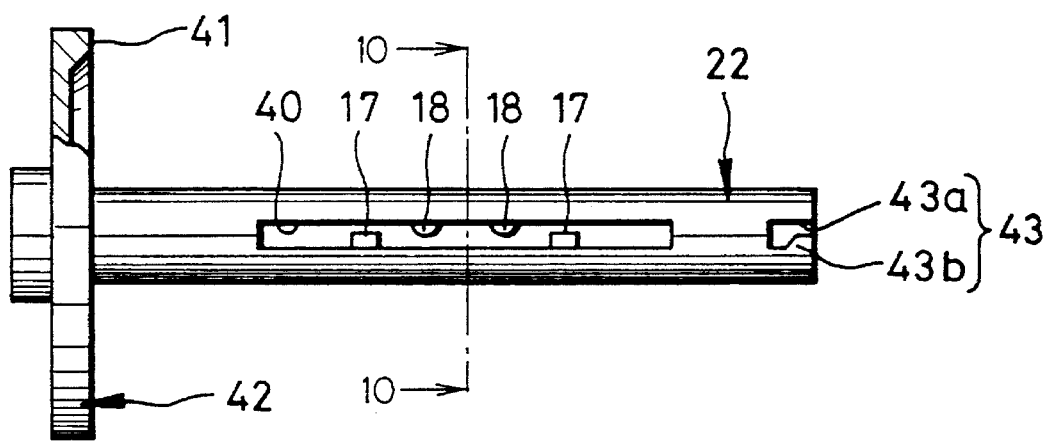
FIG. 8 is a front view illustrating an internal spool piece of a film cassette according to a third preferred embodiment of the present invention.
Figure 9:
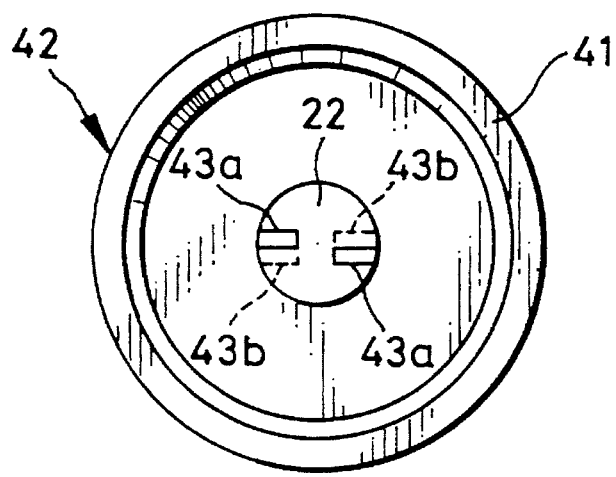
FIG. 9 is a right side view illustrating the internal spool piece of FIG. 8.
Figure 10:
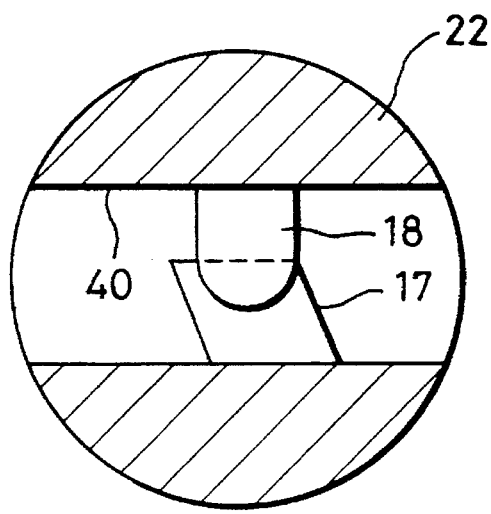
FIG. 10 is a cross section illustrating the internal spool piece, taken on Line A—A in FIG. 8.

A third preferred embodiment of the present invention will now be described with reference to FIGS. 8 to 12. Like the former embodiments, spool 39 is comprised of external and internal spool pieces 221 and 222, and is rotatably supported in cassette shell 4. As illustrated in FIGS. 8 and 10, internal spool piece 222 is provided with an inner slit 40 having a length a little larger than the width of the film trailer 5. Inner slit 40 penetrates through internal spool piece 222 along its diameter. A pair of anchoring claws 17 and pressing projections 18 are formed in inner slit 40. When film trailer 5 is inserted in inner slit 40, anchoring claws 17 are engaged with trailer holes 15, formed in film trailer 5, so that film trailer 5 is anchored in inner slit 40. Detachment is prevented by contact with pressing projections 18.

Figure 11:
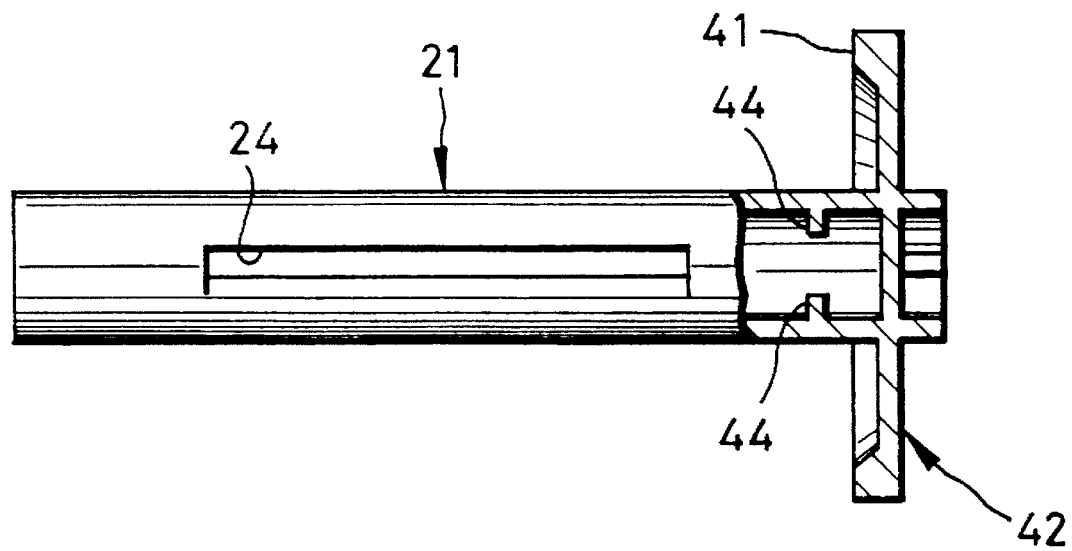
FIG. 11 is a front view illustrating an external spool piece for receiving the internal spool piece of the third embodiment.

Slit 24 formed on external spool piece 221 has a length substantially equal to that of inner slit 40. (See FIG. 11.) Flanges 42 formed respectively on spool pieces 221 and 222 are provided with circumferential ridges 41 projecting toward the respective opposite flanges 42 for contact with the outermost turn of photographic film 6 wound in a roll about spool 39. Cam recess 43 is formed on the end of the shaft portion of internal spool piece 222, and consists of straight groove 43a and widened spacing 43b. Projections 44 are formed on the inside surface of external spool piece 221 so as to form a right angle with slit 24 as illustrated in FIG. 11. Projections 44 are each inserted in straight groove 43a when spool pieces 221 and 222 are fitted together. The shaft portion of external spool piece 221 is formed to be a little shorter than the width of photographic film 6. It is noted that a circumferential ridge need be formed in only one of flanges 42.

Figure 12:
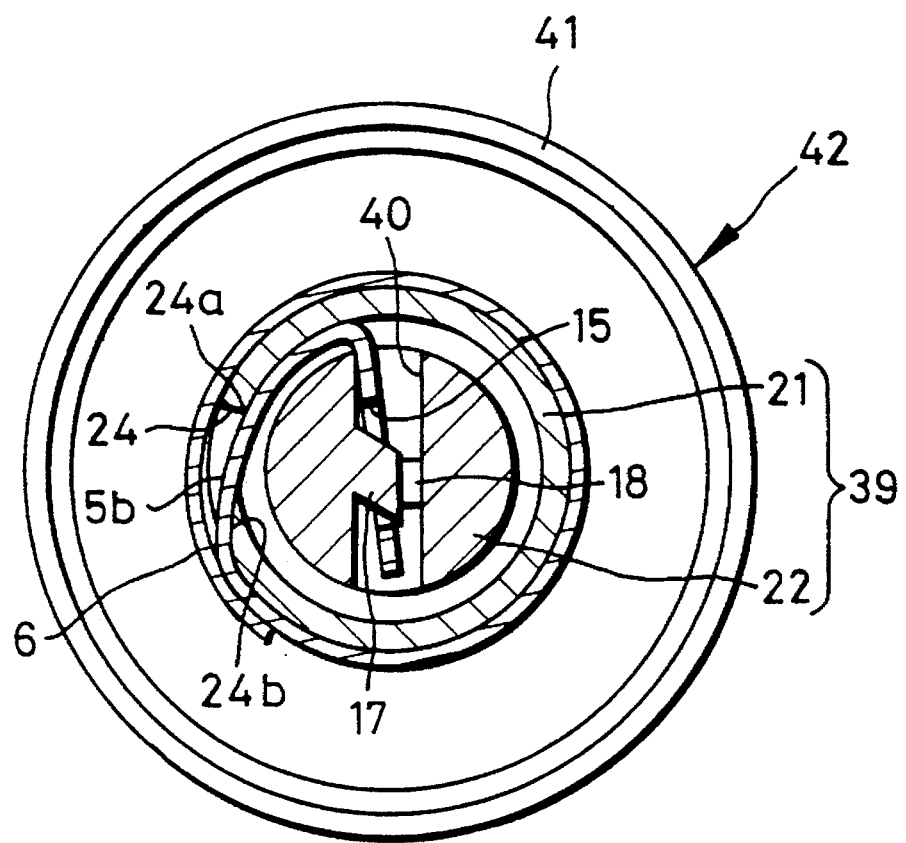
FIG. 12 is a cross section illustrating a state where the film trailer is anchored on a spool of the third embodiment.

The operation of the third embodiment is described below. Internal spool piece 222 is inserted into external spool piece 221 so as to line up inner slit 40 to coincide with slit 24. The advancing end of internal spool piece 222 is brought into contact with projections 44. Film trailer 5 is inserted in inner slit 40 through slit 24. Even when the advancing end of internal spool piece 222 does not reach the innermost position of the inside surface of external spool piece 221, the film trailer 5 can be smoothly inserted in slit 24 and inner slit 40 because each are formed so as to be longer than the width of film trailer 5. When claws 17 are engaged with trailer holes 15, film trailer 5 is anchored on internal spool piece 222. Internal spool piece 222 is then rotated in the film wind-up direction while rotating external spool piece 221 in the opposite direction until projections 44 are engaged with straight groove 43a. Then both spool pieces 221 and 222 are rotated together in the film wind-up direction so as to wind photographic film 6 on to external spool piece 221. Photographic film 6 is wound in a cylindrical roll concentric with spool 39, due to the interaction of pressing edge 24a and sloped edge 24b with photographic film 6 in a similar manner as the former embodiments, as illustrated in FIG. 12.

In the third embodiment, the shaft portion of external spool piece 221 is shorter than the width of photographic film 6. When internal spool piece 222 is rotated in a direction so as to propel the film leader to the outside of cassette shell 4, projections 44 move from straight groove 43a into cam groove 43b. Accordingly, two spool pieces 221 and 222 are slid together so as to impinge upon photographic film 6. Photographic film 6, wound about the spool 39, is thus clamped between flanges 42 and prevented from loosening. Film leader 6a of photographic film 6 is then advanced to the outside of the cassette shell by rotation of spool 39.

Figure 13:
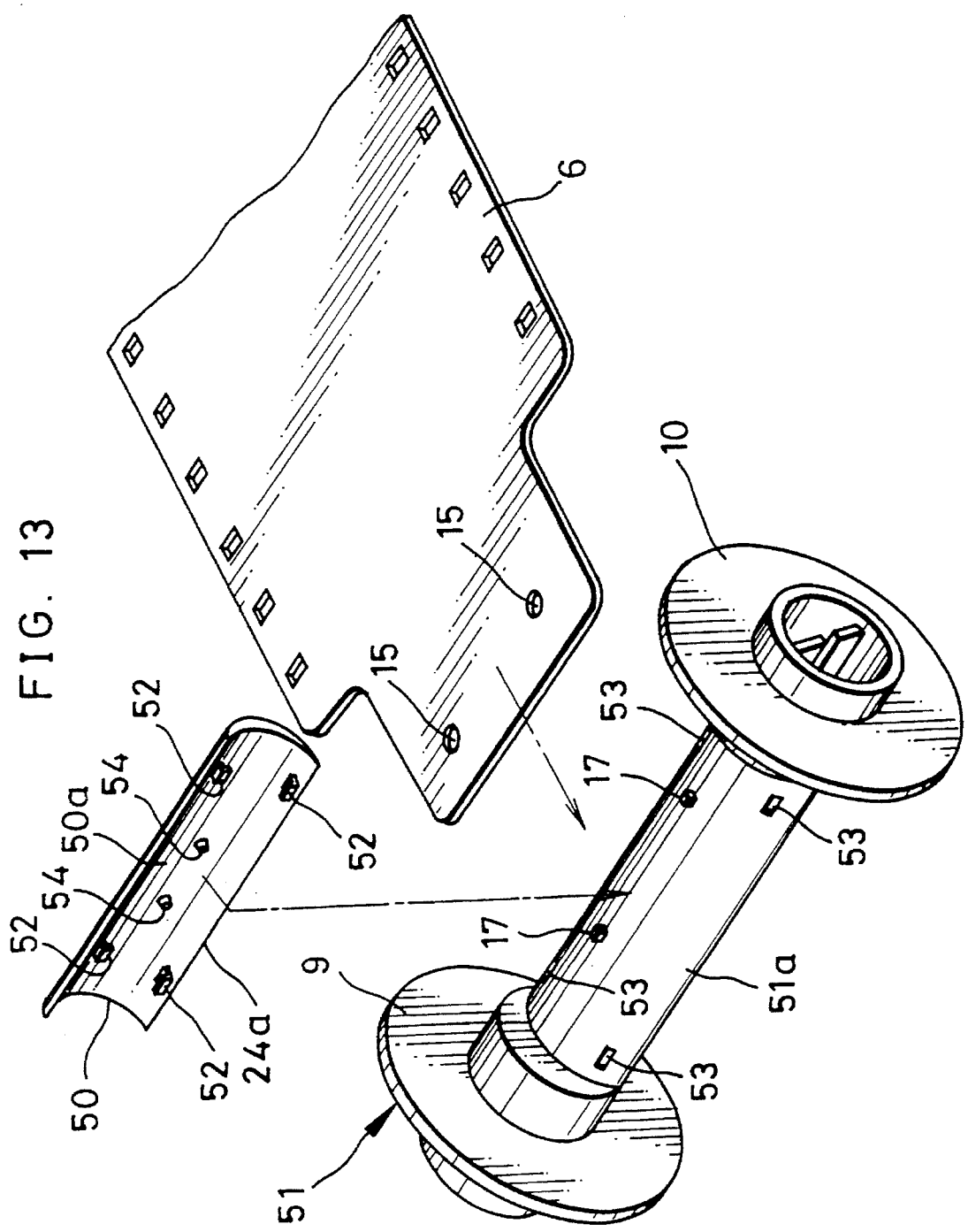
FIG. 13 is an exploded perspective view illustrating a film cassette according to a fourth preferred embodiment of the present invention.
Figure 14:
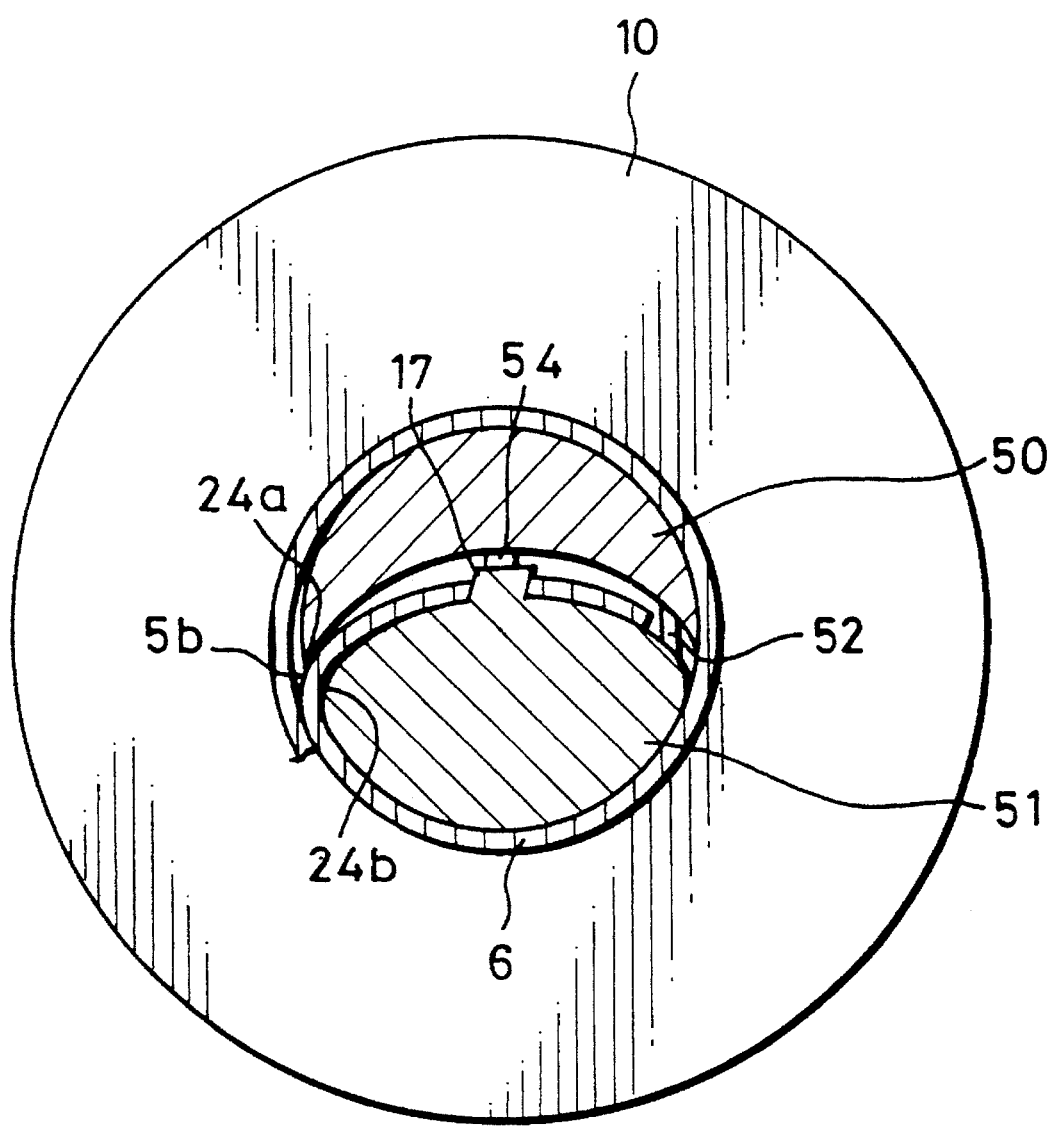
FIG. 14 is a cross section of FIG. 13 illustrating a state where the film trailer is anchored on a spool.

A fourth preferred embodiment of the present invention will now be described with reference to FIGS. 13 and 14. Detachable clamping member 50 is to be fitted on spool 51 in recess 51a formed along the axial direction of spool 51. Four anchoring holes 53 and claws 17 are integrally formed on spool 51 in recess 51a. Claws 17 serve to anchor trailer holes 15 formed in film trailer 5. Anchoring claws 52 are formed on clamping member 50 for engagement with anchoring holes 53. Pressing projections 54 press film trailer 5 against recess 51a when clamping member 50 is mounted on spool 51. A lateral edge of anchoring member 50, on the side of film trailer 5, constitutes pressing edge 24a for pressing film root portion 5b toward the axis of spool 51 when joining spool 51 and clamping member 50. An edge of recess 51a, facing pressing edge 24a, constitutes sloped edge 24b for keeping film root portion 5b curved smoothly so as to remain in contact with the surface of spool 51 while film root portion 5b is pressed by pressing edge 24a.

In operation, anchoring holes 15 are fitted on claws 17 of spool 51. Anchoring claws 52 of clamping member 50 are then engaged with anchoring holes 53 of spool 51, so as to join clamping member 50 with spool 51. Spool 51 is then rotated in the film wind-up direction so as to wind photographic film 6 about the core of spool 51. Photographic film 6 is appropriately wound, due to pressing edge 24a and sloped edge 24b, in a manner similar to the above-mentioned embodiments, as illustrated in FIG. 14.

Figure 15:
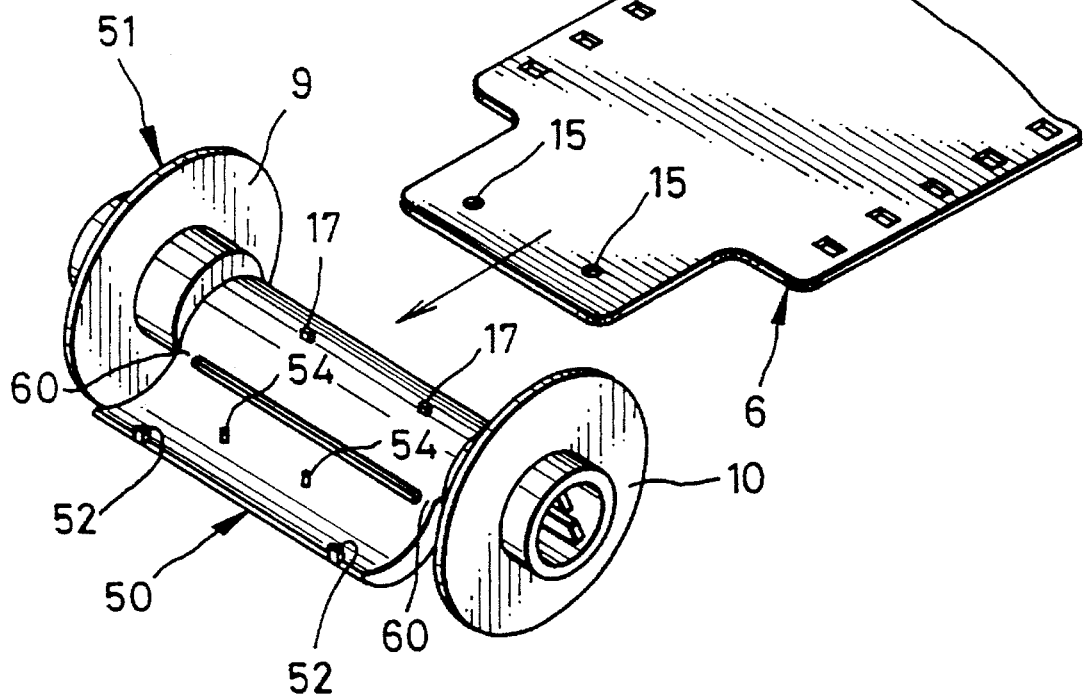
FIG. 15 is an exploded perspective view illustrating a film cassette according to a fifth preferred embodiment of the present invention.
Figure 16:
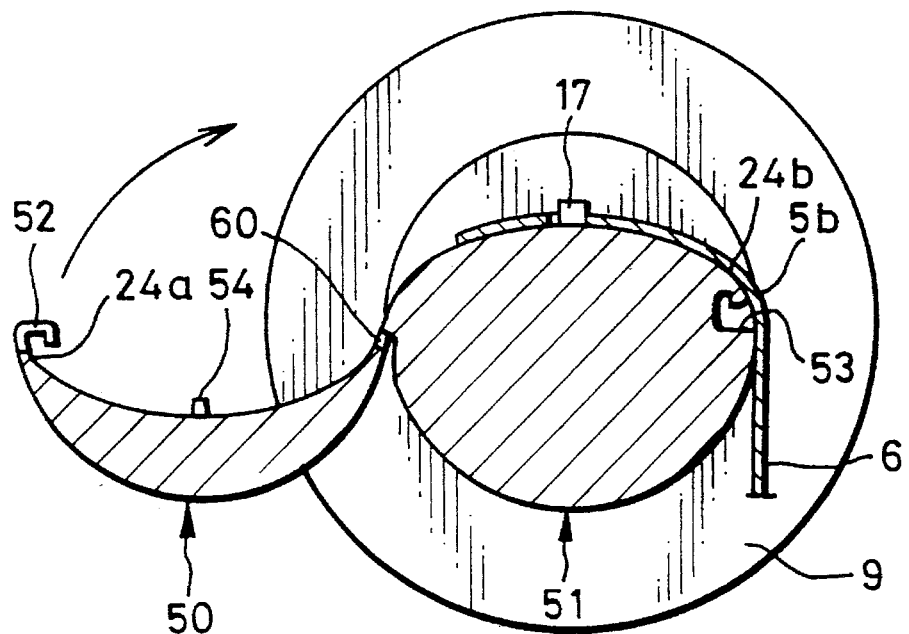
FIG. 16 is a cross section illustrating an important portion of a spool of the film cassette of FIG. 15.

A fifth preferred embodiment is described below with reference to FIGS. 15 and 16. Clamping portion 150, similar to clamping unit 50 of the fourth embodiment, is formed integrally with spool 51. The molded joint between clamping member 150 and spool 51 consists of two flexible joint portions 60 formed on both ends of the lateral side of clamping member 150 opposite to pressing edge 24a. Joint portions 60 are flexible so as to allow clamping member 150 to lie flat on spool 51. A narrow opening is formed between joint portions 60.

Figure 17:
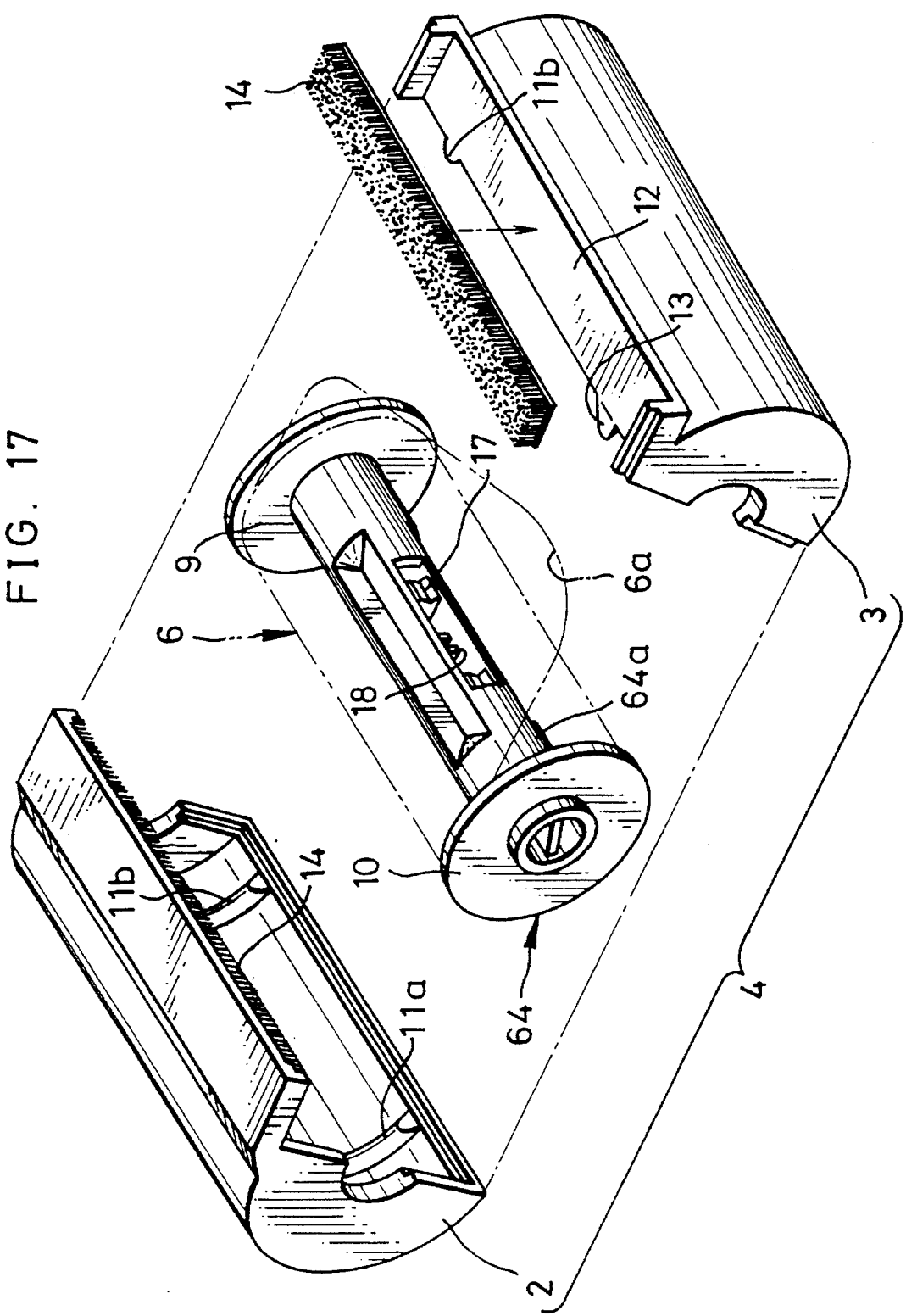
FIG. 17 is an exploded perspective view illustrating a film cassette according to a sixth preferred embodiment in which an abutting member is provided on a core of a spool.
Figure 18:
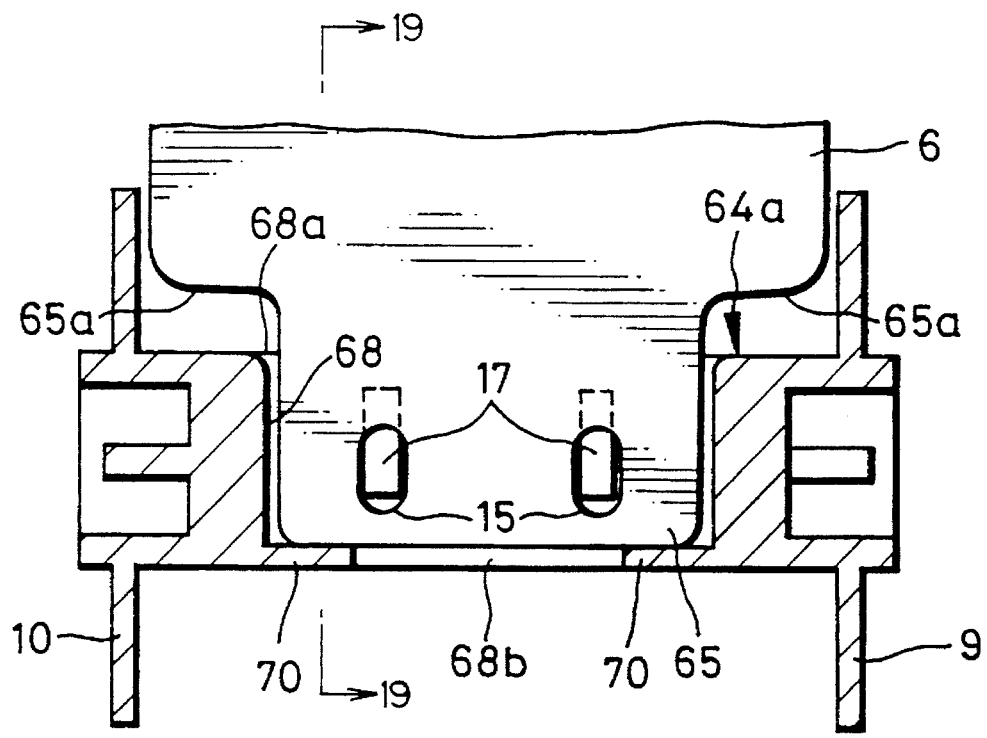
FIG. 18 is a vertical section illustrating the spool of FIG. 17.
Figure 19:
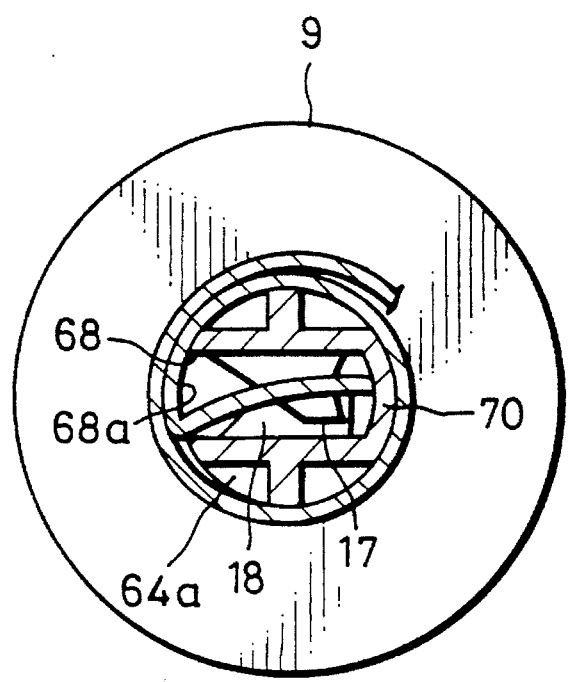
FIG. 19 is a cross section illustrating the spool, taken on Line 19—19 in FIG. 17.

In a film cassette in which rotation of the spool propels the film leader to the outside of the cassette shell, the resistance during an advance against the plush in the film passage mouth is transmitted to the film trailer so as to tend to cause a reverse flexure of the film trailer. Due to pressure applied to the film trailer by the spool core, the film trailer may be torn in the shoulder portions beside the trailing end portion. FIGS. 17–19 illustrate a sixth embodiment of the invention which prevents the film trailer from being damaged. In this embodiment, photographic film 6 is wound in a roll about spool 64 on spool core 64a. Elements similar to those in the former embodiments are designated with identical reference numerals.

Referring to FIGS. 18 and 19, slit 68 is formed in spool core 64a. Film trailer 65 is inserted into slit 68 through entrance 68a of slit 68. The end portion of film trailer 65 has a reduced width. Abutting walls 70, for contact with the trailing end of film trailer 65 in order to provide a stop for film trailer 65, are formed on exit 68b of slit 68.

Anchoring claws 17 are formed in slit 68 so as to anchor trailer holes 15 formed in film trailer 65. Pressing projections 18 are also formed in slit 68 for pressing film trailer 65 so as to prevent trailer holes 15 from being disengaged from claws 17. The trailing end portion of film trailer 65 has a length larger than the diameter of spool core 64a. As is illustrated in FIG. 18, shoulder portions 65a, defined adjacent to the trailing end portion of film trailer 65, do not come into contact with spool core 64a when trailer holes 15 are anchored on claws 17.

The operation of this embodiment will now be described. When spool 64 is rotated in the film unwinding direction (clockwise in FIG. 17), film leader 6a is propelled to film passage mouth 12. When film leader portion 6a reaches plush 14, the resistance to the advancement of photographic film 6 becomes larger due to interaction between film leader portion 6a and plush 14. This increased resistance is transmitted to film trailer 65. Under such a condition film trailer 65 would tend to be retracted toward the outside of slit exit 68b, or in the downward direction in FIG. 18. However, film trailer 65 is prevented from being retracted by abutting walls 70 so that shoulder portions 65a are never pressed against spool core 64a proximate slit entrance 68a. Further rotation of the spool 64 transmits the rotary force of spool 64 to photographic film 6 while film trailer 65 is fixedly positioned by abutting walls 70. Film leader 6a can thus be advanced through film passage mouth 12 even against the additional resistance due to plush 14 without damaging film trailer 65.

Even if film trailer 65 is flexed in a reversed direction, at entrance 68a of slit 68, by rotating spool 64 as illustrated in FIG. 19, cracks will not form on shoulder portions 65a because one lateral edge of slit entrance 68a abuts film trailer 65 widthwise.

Figure 20:
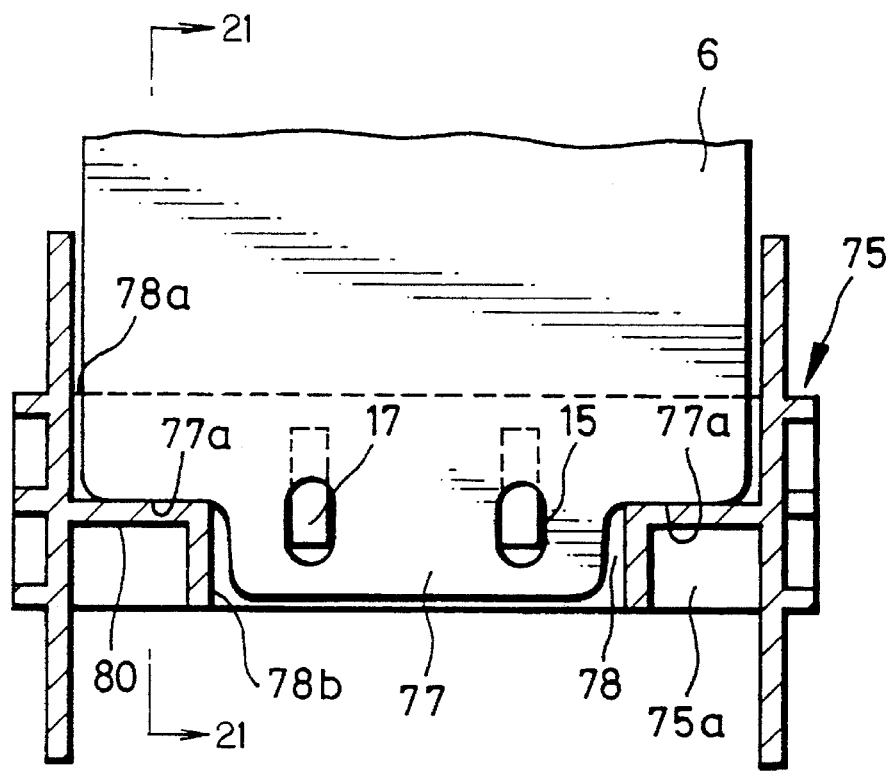
FIG. 20 is a vertical section illustrating a spool according to a seventh preferred embodiment of the present invention.
Figure 21:
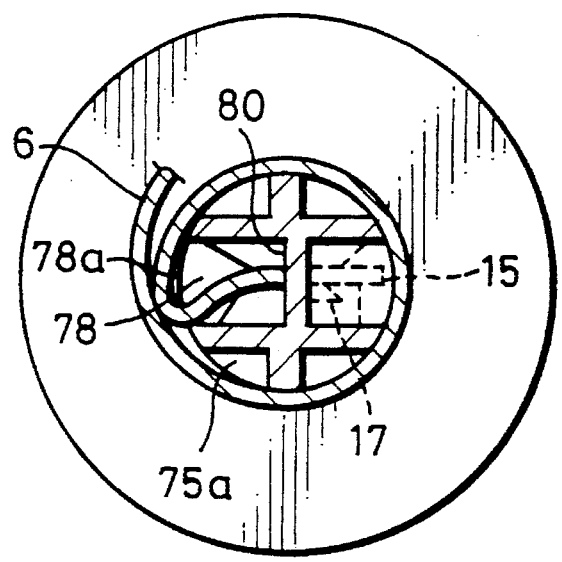
FIG. 21 is a cross section illustrating the spool, taken on Line 21—21 in FIG. 20.

Referring to FIGS. 20 and 21, illustrating a seventh preferred embodiment of the present invention, slit 78 is formed on core 75a of spool 75 for inserting film trailer 77 of photographic film 6. Anchoring claws 17 and pressing projections 18 are formed in slit 78 in a manner the similar embodiments discussed above, for anchoring holes 15 of film trailer 77. A pair of shoulder portions 77a are formed to provide a trailing end portion that is narrow. Shoulder portions 77a are located substantially on the axis of spool core 75a.

An entrance 78a of slit 78 is wide enough to receive the full width of photographic film 6, whereas exit 78b of slit 78 is narrower so as to fit on the trailing end portion of film trailer 77. Abutting walls 80 are formed substantially at the middle of slit 78, in a direction of film insertion therein, so as to reduce the length of slit 78 at slit exit 78b. Abutting walls 80 are in contact with shoulder portions 77a to prevent them from being moved in a downward direction in FIG. 20. Accordingly, rotation of spool 75 is transmitted to photographic film 6 via shoulder portions 77a.

When spool 75 is rotated in the film unwinding direction, little reverse flexure takes place on shoulder portions 77a, positioned inside slit 78, due to the force applied in the film retracting direction. Photographic film 6 is secured across the full width thereof. Therefore, no irregular force will be applied to shoulder portions 77a and no cracks tend to form on shoulder portions 77a.

Figure 22:
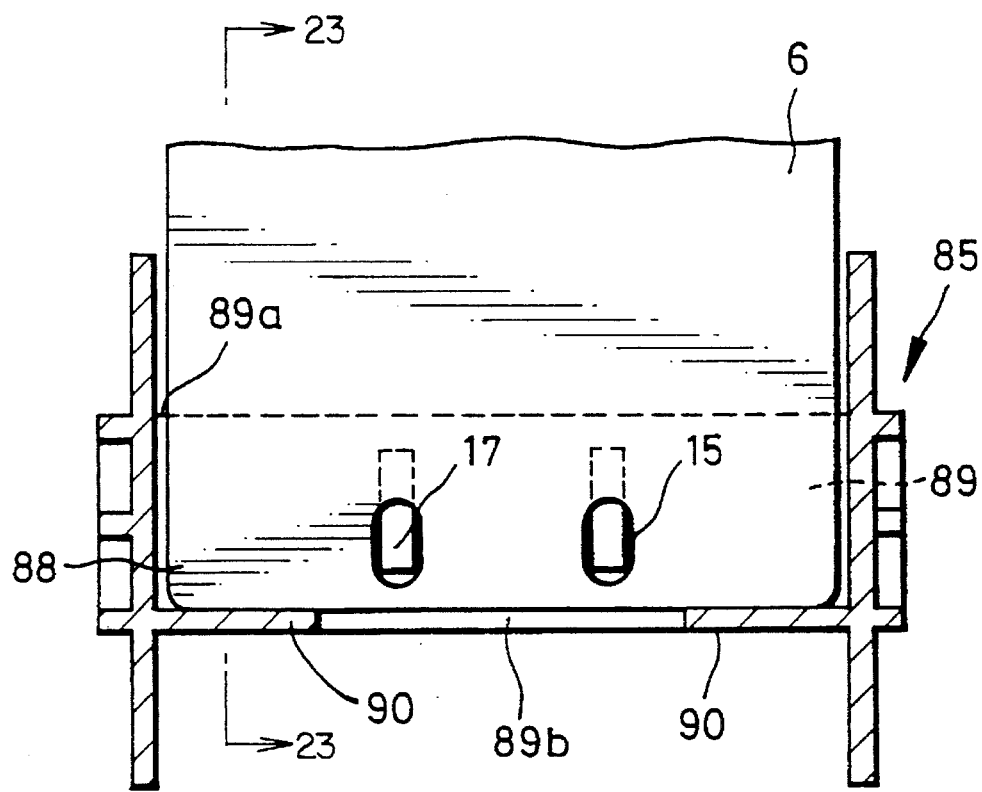
FIG. 22 is a vertical section illustrating a spool according to an eighth preferred embodiment of the present invention.
Figure 23:
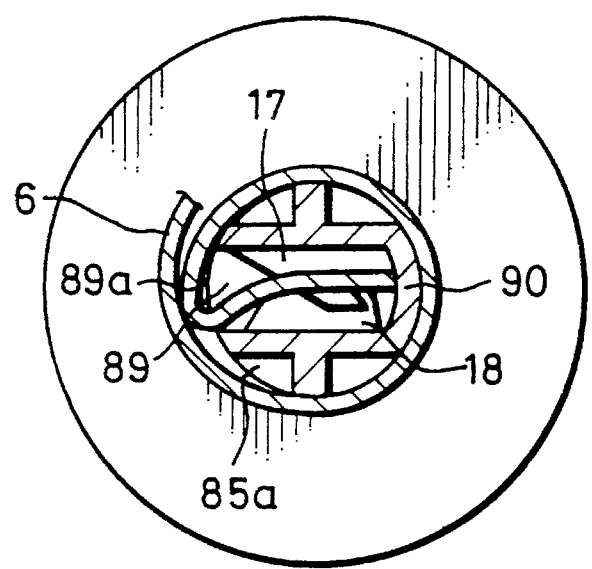
FIG. 23 is a cross section illustrating the spool, taken on Line 23—20 in FIG. 22.
Figure 24:
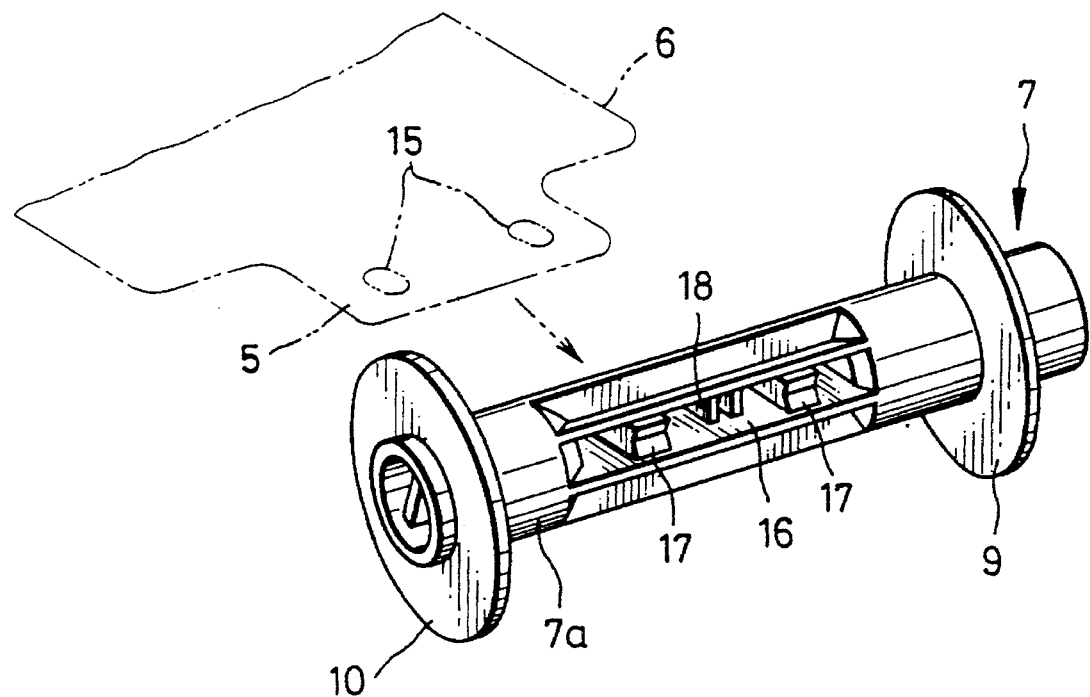
FIG. 24 is a perspective view illustrating a spool of a conventional film cassette.
Figure 25:
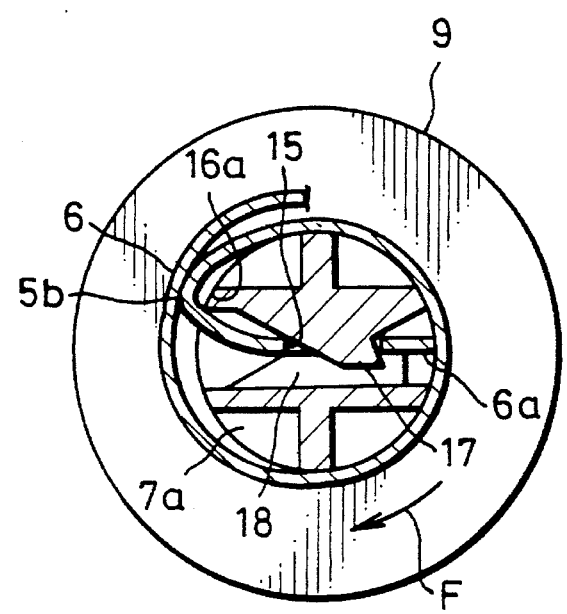
FIG. 25 is a cross section illustrating the spool in a state where a film root portion is sharply bent.
Figure 26:
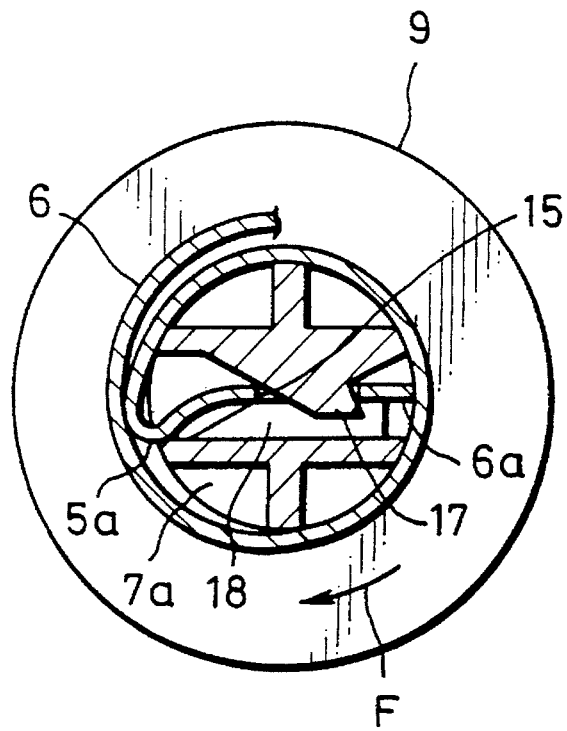
FIG. 26 is a cross section illustrating the spool at the time of rotation in the film unwinding direction.
Figure 27:
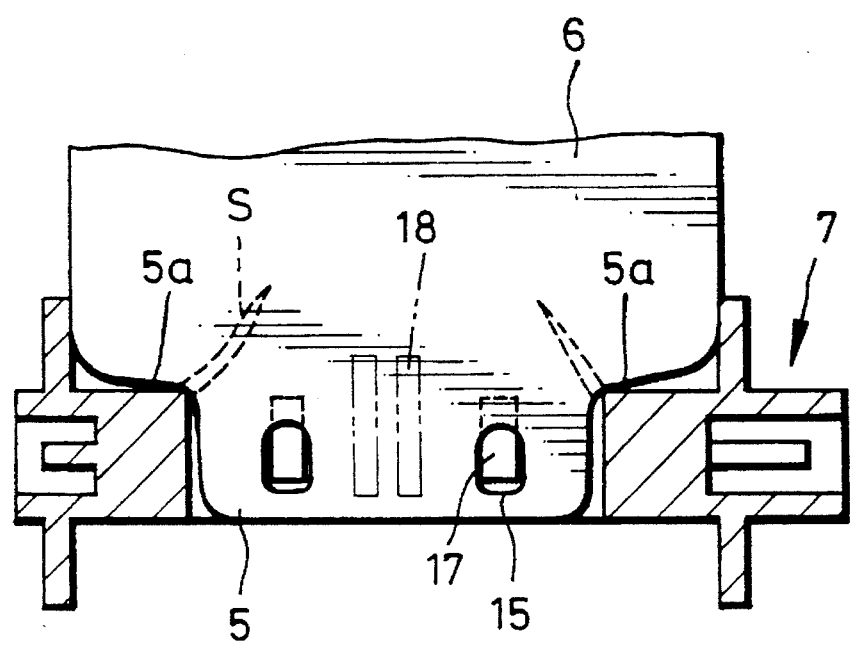
FIG. 27 is a vertical section illustrating the spool.

FIGS. 22 and 23 illustrate an eighth further preferred embodiment of the invention. Slit 89 is formed in core 85a of spool 85 for inserting film trailer 88 of photographic film 6. Anchoring claws 17 and pressing projections 18 are formed in slit 89 for anchoring trailer holes 15. Film trailer 88 has the same width as the rest of photographic film 6.

Entrance 89a of slit 89 has a length substantially equal to the width of photographic film 6. Abutting walls 90 are formed on both sides of exit 89b of slit 89. Abutting walls 90 contact the trailing end of film trailer 88 so as to stop film trailer 88 from moving downward in FIG. 22. The rotary force at spool 85, when rotated, is transmitted to photographic film 6 via film trailer 88.

When spool 85 is rotated in the film unwinding direction, the trailing end of film trailer 88 is secured across the full width thereof when force is applied in the film retracting direction. Therefore no irregular force will be applied to the film trailer 88 and no cracks tend to appear therein.

It is noted that, in the above embodiments, abutting walls 70, 80, and 90 are located within the slit in the range from the slit entrance to the slit exit, exclusive portions proximate the slit entrance.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic film cassette wherein a spool, with photographic film wound thereon, is rotatably contained in a cassette shell, and rotation of said spool propels a film leader to an outside of said cassette shell, compromising:

a slit formed in a core of said spool for receiving a film trailer portion of said photographic film, said slit having a shape which corresponds to the shape of said film trailer portion to conform to said film trailer portion, an entrance portion of said slit having a width which is substantially equal to a maximum width of said photographic film;

at least one anchoring hole formed in said film trailer portion;

at least one anchoring claw projecting from a first inside surface of said slit so as to engage with said anchoring hole; and at least one pressing projection projecting from a second inside surface of said slit, and extending toward said first inside surface, so as to press said film trailer portion toward said anchoring claw and prevent said anchoring hole from disengaging from said anchoring claw wherein said entrance portion of said slit extends in a direction of an axis of rotation of said spool core, said entrance portion receives said film trailer portion across the maximum width of said photographic film; and an abutment positioned inside of said slit so as to abut said film trailer portion.

2. A photographic film cassette as claimed in claim 1, wherein said abutment is a pair of abutting portions formed between said entrance portion and a slit exit portion which is opposite to said slit entrance.

3. A photographic film cassette as claimed in claim 2, wherein said slit has two lateral sides and said abutment comprises two abutment portions which extend in a direction of an axis of rotation of said spool core, from both of said lateral ends of said slit towards a lengthwise middle of said slit, so as to abut lateral ends of said film trailer portion.

4. A photographic film cassette as claimed in claim 3, wherein said lateral ends of said film trailer portion are defined by recesses formed in said film trailer portion to be abutted by said abutment.

5. A photographic film device wherein a spool, with photographic film wound thereon, is rotatably contained in a cassette shell, and rotation of said spool propels a film leader to an outside of said cassette shell, said device comprising:

a spool core having a slit formed therein for receiving a film trailer portion of said photographic film, said trailer portion having a narrowed portion which defines two lateral shoulder portions of said trailer portion;

a pair of abutment portions, having abutment surfaces, disposed inside said slit and extending from lateral edges of said slit to define a recess in said slit, a width of said recess corresponding substantially to a width of said narrowed portion, said narrowed portion being received in said recess; and said lateral shoulder portions extending substantially along an axis of said core and abutting against respective ones of said abutment surfaces when said trailer portion is received in said slit.

6. A photographic film device as claimed in claim 5, further comprising:

at least one anchoring projection formed on a first inside surface of said slit to engage with an anchoring hole formed in said trailer portion;

at least one pressing projection formed on a second inside surface of said slit and projecting towards said first inside surface to prevent said anchoring projection from disengaging from the anchoring hole.

* * * * *